(12) United States Patent
Haapanen et al.

(10) Patent No.: US 12,017,877 B2
(45) Date of Patent: Jun. 25, 2024

(54) METHOD AND A DEVICE FOR JOINING ENDS OF FIBER WEBS IN A PARENT ROLL CHANGE OF AN UNWINDER

(71) Applicant: Valmet Technologies Oy, Espoo (FI)

(72) Inventors: Jaakko Haapanen, Järvenpää (FI); Henry Virta, Järvenpää (FI); Kenneth Åkerlund, Järvenpää (FI)

(73) Assignee: Valmet Technologies Oy, Espoo (FI)

(*) Notice: Subject to any disclaimer, the term of this patent is extended or adjusted under 35 U.S.C. 154(b) by 0 days.

(21) Appl. No.: 17/838,188

(22) Filed: Jun. 11, 2022

(65) Prior Publication Data

US 2022/0396444 A1 Dec. 15, 2022

(30) Foreign Application Priority Data

Jun. 15, 2021 (FI) .................................. 20215701

(51) Int. Cl.
*B29C 65/00* (2006.01)
*B65H 19/18* (2006.01)
(Continued)

(52) U.S. Cl.
CPC ..... *B65H 19/1852* (2013.01); *B65H 19/1857* (2013.01); *B65H 19/1889* (2013.01); *B65H 19/20* (2013.01); *B65H 21/00* (2013.01); *B29C 65/568* (2013.01); *B29C 65/609* (2013.01); *B29C 65/741* (2013.01); *B29C 65/7435* (2013.01); *B29C 65/7437* (2013.01);
(Continued)

(58) Field of Classification Search
CPC ................ B29C 65/568; B29C 65/609; B29C 65/741; B29C 65/7435; B29C 65/7437; B29C 65/7832; B29C 65/7847; B29C 65/80; B29C 66/8145
See application file for complete search history.

(56) References Cited

U.S. PATENT DOCUMENTS

| | | | | |
|---|---|---|---|---|
| 2,002,554 A | * | 5/1935 | Townley ................. | B31F 5/027 29/21.1 |
| 3,284,873 A | * | 11/1966 | Noel ...................... | B21D 39/02 29/21.1 |
| 3,741,079 A | * | 6/1973 | Bossons ................. | B31F 5/027 493/381 |

(Continued)

FOREIGN PATENT DOCUMENTS

| CA | 1301137 C | 5/1992 |
|---|---|---|
| DE | 4124022 A1 | 1/1993 |

(Continued)

*Primary Examiner* — Philip C Tucker
*Assistant Examiner* — Nickolas R Harm
(74) *Attorney, Agent, or Firm* — James Earl Lowe, Jr.

(57) ABSTRACT

A method for joining ends of fiber webs with a device comprising a tool element with a gripping device and a traversing punching device. A run of the fiber web from the emptying parent roll is moved to a joining position at the tool element. The trailing end of the parent roll fiber web is cut upstream from the joining position and the fiber web is attached to the tool element by a gripping device of the tool element. An end of a new roll fiber web is guided to contact with and to an overlapping position with the trailing end of the parent roll fiber. The traversing punching device is moved across the width direction of the fiber webs and makes at least one joint cut and joins the fiber webs. The new fiber web is cut downstream from the joint, and then tension control is turned on.

7 Claims, 5 Drawing Sheets

(51) Int. Cl.
 *B65H 19/20* (2006.01)
 *B65H 21/00* (2006.01)
 *B29C 65/56* (2006.01)
 *B29C 65/60* (2006.01)
 *B29C 65/74* (2006.01)
 *B29C 65/78* (2006.01)
 *B29C 65/80* (2006.01)

(52) U.S. Cl.
 CPC ...... *B29C 65/7832* (2013.01); *B29C 65/7847* (2013.01); *B29C 65/80* (2013.01); *B29C 66/8145* (2013.01); *B65H 2301/4148* (2013.01)

(56) References Cited

U.S. PATENT DOCUMENTS

| | | | | |
|---|---|---|---|---|
| 4,315,794 | A * | 2/1982 | Palmieri | B65H 19/1873 |
| | | | | 83/100 |
| 4,343,667 | A * | 8/1982 | Hollis | B29C 66/435 |
| | | | | 156/266 |
| 5,018,535 | A | 5/1991 | Da Silva | |
| 7,980,504 | B2 * | 7/2011 | Butterworth | B65H 19/1847 |
| | | | | 242/555.3 |
| 9,670,022 | B2 * | 6/2017 | Machamer | B29C 66/43 |

FOREIGN PATENT DOCUMENTS

| | | |
|---|---|---|
| DE | 102020108158 | 9/2021 |
| EP | 1163178 B1 | 1/2000 |
| FI | 89287 B | 5/1993 |
| FI | 100323 B | 12/1995 |
| FI | 96299 B | 2/1996 |
| FI | 121594 B | 11/2011 |
| JP | 6624164 A | 1/1987 |
| WO | 2007107627 A | 9/2007 |

* cited by examiner

METHOD AND A DEVICE FOR JOINING ENDS OF FIBER WEBS IN A PARENT ROLL CHANGE OF AN UNWINDER

TECHNICAL FIELD

The present invention relates generally to unwinding of fiber webs. In particular, the present invention relates to joining ends of fiber webs in a parent roll change of an unwinder, especially in an unwinder of a slitter-winder. More particularly the present invention relates to a method according to the preamble of the independent method claim and to a device according to the preamble of the independent device claim.

BACKGROUND

As known, fiber webs, such as paper, board or pulp fiber webs, are manufactured in machines together forming a fiber web manufacturing line, which may be hundreds of meters long. Modern paper machines may produce more than 450,000 tons of paper per year. The speed of a paper machine may exceed 2000 m/min and the width of a paper fiber web may be more than 11 meters.

As known from the prior art in fiber web producing processes typically comprise an assembly formed by a number of apparatuses arranged consecutively in the process line. A typical production and treatment line comprises a head box, a wire section and a press section as well as a subsequent drying section and a reel-up. The production and treatment line can further comprise finishing devices, for example a calender and/or a coater. The production and treatment line also comprise typically at least one slitter-winder for forming customer rolls as well as a roll packaging apparatus.

In fiber web production lines, manufacturing operates as a continuous process. The finished fiber web being output from the machine is wound with a reel-up around a reeling shaft, i.e. a reel spool, into a parent roll (a machine roll). The purpose of reeling is to modify the fiber web manufactured as planar into a more easily processable form. In the reel-up the continuous process of the machine breaks for the first time and shifts into periodic operation.

The fiber web wound onto the parent roll is full-width so it must be slit into partial fiber webs with suitable width and the partial fiber webs are wound to partial fiber web rolls (customer rolls) of suitable length or of suitable diameter for the customers. The slitting and winding take place as known from prior art in an appropriate separate machine i.e. in a slitter-winder.

As known from the prior art, in the slitter-winder the parent roll is unwound, the full-width fiber web is slit on the slitting section into several narrower partial fiber webs which are wound up on the winding section around winding cores or around winding shafts or around winding cores located on the shafts, such as spools, into customer rolls. When the customer rolls are completed, the slitter-winder is stopped and the rolls i.e. the so-called set is removed from the machine after which the process is continued with the winding of a new set. These stages are repeated periodically until fiber web runs out of the parent roll, whereby a parent roll change is performed, in which a trailing end of the running out parent roll is attached to the beginning end of the new parent roll and there after the operation continues again as the unwinding of a new parent roll, slitting the full-width fiber web into partial fiber webs and winding the customer rolls, or whereby a parent roll change is performed and the beginning end of the new parent roll is threaded to the winder.

As known from prior art, in connection with slitter-winders, a full-width fiber web coming from an unwinder is cut with the slitter-winder into partial fiber webs which are wound by a windup into partial fiber web rolls. A partial-fiber web windup can be a windup of carrier roll type in which the partial fiber web rolls are wound supported by carrier rolls by means of a winding nip between the forming fiber web roll and a second carrier roll. In the windup of carrier-roll type, the second carrier roll can be a set of belt rolls in which an endless belt loop is arranged around two rolls. The partial-fiber web windup can also be a center-driven windup in which the partial fiber web roll is rotated from the center and winding takes place by means of the nip between the forming fiber web roll and the winding drum.

When unwinding the fiber web from the unwinder and the roll being unwound is almost empty, the parent roll change is performed. This is often still done totally manually. Known is also a so-called automatic parent roll change, whereby in methods known from prior art the slitter-winder is stopped and the old fiber web is picked up with a pick-up device, e.g. a suction device, and cut after which the emptied machine roll is taken away and a next machine roll to be unwound is brought to its place. The fiber web end of the new machine roll is brought to a joining position and the ends of the old fiber web and the new fiber web are joined to each other by applying different joining methods, the slitter-winder and the unwinder being stopped. Such an arrangement known from prior art is described in European patent specification 1163178.

Also, arrangements in connection with continuous unwinders are known from prior art in which the joining is performed for threading the fiber web in which the joining takes place at crawl or running speed. These known arrangements require a lot of preparing work and accuracy in order to successfully perform the joining and additionally they are often poorly applicable to be used in connection with slitter-winders, because in these arrangements the joint provided is only applicable for threading requirements, and thus the slitter-winder has to be stopped after this event and the joint has to be removed from all rolls, because it is not suitable for further processing, e.g. for printing, and machine time is again spent on this work. Such embodiments are described in e.g. patent specifications FI74678, FI100323 and FI96299.

In FI patent publication 89287 is disclosed method for joining together a first fiber web end and a second fiber web end, in which method the fiber web ends that are to be joined together are firmly held by means of suction, the said fiber web ends opposing one another with an overlap whilst they are being joined together. In FI patent publication 121594 is disclosed an arrangement designed such that an origin of a new fiber web is directed by gravitational force along a fiber web course for a normal operation at the arrangement in such a manner that running of an old fiber web from the fiber web course is deviated in the normal operation, so that overlapping of the old fiber web on a fiber web guide roller of a slitter winder is increased. In WO patent application publication 2007107627 is disclosed a method, in which for the parent roll change, the speed of the slitter-winder is decelerated to crawl speed and when the slitter-winder operates at crawl speed, the fiber web ends are joined together.

In the methods and devices known from the prior art the joining of the fiber web ends is provided by using adhesive agent, for example glue or tape, which need equipment for providing the adhesive agent in order to create the joint between the fiber web ends. Naturally also a continuous supply of the adhesive agent is needed and furthermore there might exist a need for different types of adhesive agents depending on grades of fiber webs produced. It should also be noted that especially when producing thick fiber webs, such as pulp fiber webs the methods and devices known from prior art do not provide a satisfying solution as typically strength of the joint between the fiber web ends is not high enough.

Mainly two kinds of devices are known from prior art to join ends of fiber webs by punching: punching devices with against each other pressing punch tool and its counter tool and a rotating roll with blades or like for punching the ends of the fiber webs and its counter roll. These kinds of devices are well functionable when the width of the fiber webs is small but in case of wider webs occurs a problem as several joint are cuts needed in cross-direction of the fiber web and punching these simultaneously requires a lot of force due to this the cross-dimensions of parts of the devices are large, which increases costs and also may cause disadvantages in layout solutions.

It is also known from prior art to join ends of full-width fiber webs by a form-fitting overlapping joint. Typically, in overlapping position placed ends of fiber webs are punched at several locations and flaps of cuts created by the punching form the form-fitting joint. Typically, a punching assembly comprising punching blades, where one blade for each punch cut and a respective counter cut is provided, is used to press out two different types of paired flaps in the ends of the webs. Punched flaps are structured so that in one projecting tab and its flat section run with the direction of web travel and the other is similar but against the direction of web travel. Thus, the flap opens such that a folding line of the flap is straight in view of the web travel direction. When the flaps open the overlapping ends of the webs must move in respect of each other in accordance with the length of the flap before the joining occurs. In these kinds of arrangements it is disadvantageous that for each punch cut a respective counter cut is needed. This disadvantage even degrades, when the webs have a great width of several meters, as thus several individual punch cuts and counter cuts in width direction are needed to secure the joining. This increases cost of the devices used in the arrangements. Additionally disadvantageous is that these types of joints need movement of the overlapping web ends in respect of each other to secure the joining.

In patent application publication DE4124022A1 is disclosed an arrangement for thin material end joining, in which differing flaps punched through ends of the materials to hold the material ends together. The punching assembly comprising punching blades, where one blade for each punch cut and a respective counter cut is provided, is used to press out two different types of paired flaps in the ends of the webs. The punched flaps are structured so that in one projecting tab and its flat section run with the direction of material travel, and the other is similar but against the direction of material travel.

In patent application publication JPS624164A is disclosed a sheet connecting method, in which U-shaped cuts are bored at an overlap section of two sheets and one flap is protruded through the other cut. The sheets are displaced to join the flap with the cut. In this method one blade for each punch cut and a respective counter cut is provided.

A disadvantage in many of from the prior art known methods and devices is that even though they are as such well-functioning they might be too complicated and thus expensive for some of the present needs.

SUMMARY

The object of the invention is to provide a method in which the above-described disadvantages related to the parent roll change in the unwinder have been eliminated or at least minimized.

An object of the invention is to create a method and a device, in which disadvantages and problems of known methods and devices especially relating to joining of the ends of the fiber webs in the parent roll change in the unwinder are eliminated or at least minimized.

A particular object of the invention is to create an improved method and an improved device relating to joining of the ends of the fiber webs in the parent roll change in the unwinder.

In order to achieve the above objects and those described later the method according to the invention is mainly characterized by the features of the characterising part of the independent method claim and the device according to the invention is mainly characterized by the features of the independent device claim. In the dependent claims further advantageous features and aspects of the invention are defined.

In accordance with the invention the method for joining ends of fiber webs in a parent roll change of an unwinder is configured to be performed by a device comprising a tool element, a gripping device and a traversing punching device, whereby at a stage, in which a parent roll in the unwinder is almost empty, the run of the fiber web from the emptying parent roll is moved to a joining position at the tool element and the trailing end of the fiber web from the emptying parent roll is cut upstream from the joining position and the fiber web is attached to the tool element by means of gripping effect created by the gripping device, whereby at a next stage a beginning end of a new fiber web from a new parent roll is guided to contact with and to an overlapping position with the trailing end of the fiber web from the emptying parent roll and the rotating movement of the new parent roll in the unwinder is stopped, at a next stage the traversing punching device is moved across the width direction of the fiber webs and is configured to make at least one joint cut to the overlapping ends of the fiber webs and to join the ends of the fiber webs to each other, the beginning end of the new fiber web from the new parent roll in the unwinder is cut downstream from the joint for removing the beginning end simultaneously or after making the at least one joint cut, and at a next control of tension of the joined fiber webs is turned on and the joint joining the ends of the fiber webs is ready.

According to an advantageous feature the run of the fiber web from the emptying parent roll is moved to the joining position at the tool element by a counter element of the tool element.

According to an advantageous feature the beginning end of the new fiber web from the new parent roll is guided to contact with and to the overlapping position with the trailing end of the fiber web from the emptying parent roll to a location between the tool element and the counter element.

According to an advantageous feature the beginning end of the new fiber web from the new parent roll in the unwinder is cut against a sharp edge of the counter element downstream from the joint for removing the beginning end.

According to an advantageous feature in the method the gripping effect of the gripping device is provided by underpressure of an underpressure device provided in connection with the tool element.

According to an advantageous feature the new parent roll in the unwinder is rotated manually and the beginning end of the fiber web from the new parent roll is guided to contact with the trailing end of the fiber web from the emptying parent roll advantageously manually.

According to an advantageous feature the method is performed in an unwinder of a slitter-winder and operation of the slitter-winder is interrupted, when the run of the fiber web from the emptying parent roll is moved to a joining position at a tool element and the trailing end of the fiber web from the emptying parent roll is cut upstream from the joining position and the fiber web is attached to the tool element by means of underpressure created by an underpressure device of the tool element and the operation of the slitter-winder continues, when the joint joining the ends of the fiber webs is ready.

In accordance with the invention the device for joining ends of fiber webs in a parent roll change of an unwinder comprises a tool element, a gripping device for attaching a trailing end of a fiber web from an emptying parent roll in the unwinder to an beginning end of a fiber web from a new parent roll, wherein the tool element further comprises a traversing punching device configured to move across overlapping ends of the trailing end of the fiber web from the emptying parent roll and of a beginning end of a fiber web from a new parent roll in width direction of the fiber webs to make at least one joint cut to the overlapping ends of the fiber webs and to join the ends of the fiber webs.

According to an advantageous feature the tool element comprises the gripping device configured as an underpressure device for attaching the trailing end of the fiber web.

According to an advantageous feature the device further comprises a counter element of the tool element configured to press the overlapping ends of the trailing end of the fiber web from the emptying parent roll and the beginning of the fiber web from the new parent roll together during the joining movement of the traversing punching device.

According to an advantageous feature the counter element of the tool element is configured to move the trailing end of the fiber web from the emptying parent roll to the joining position at the tool element.

According to an advantageous feature the traversing punching device is a joining wheel with at least one punching element, advantageously at least one punching blade.

According to an advantageous feature the joining wheel is an idle wheel, and its rotating movement is provided by the fiber webs, which are locked to place by the counter element.

According to an advantageous feature the device is located in a slitter-winder and upstream from a first roll of the slitter winder.

According to an advantageous aspect the device comprises a traversing punching device, advantageously a wheel, with at least one punching element, advantageously at least one punching blade, which is configured to move across the overlapping ends of the fiber webs in cross-direction in a traversing way and punches the overlapping ends of the fiber webs and simultaneously joins the ends of the fiber webs. The wheel is advantageously an idle wheel and its rotating movement is provided by the fiber webs. The device also comprises a counter element, which is advantageously planar in its main outer form and may be provided with grooves for the punching elements, advantageously the punching blades. The device and thus the movement path of the wheel is located between the parent roll in the unwinder and the first roll or roll row towards the slitting section of the slitter-winder, and above the open run of the fiber web. The beginning end of the fiber web running from the new parent roll is moved to the joining position by the counter element. The location of the counter element in its resting position is close to the slitting section such, that it does not create an obstacle for an operator during threading.

According to an advantageous aspect the ends of the fiber web, i.e., the trailing end of the emptying parent roll and the beginning end of the new parent roll, are guided to an overlapping position and pressed together simultaneously punching joining cuts to both ends of the fiber web such that a joint in tension direction of the fiber webs is achieved.

According to an advantageous aspect the overlapping trailing end and beginning end of the fiber webs are punched by the punching element/-s of the traversing punching device and provided with a joint cut form and tension of the fiber webs finalizes the locking of the ends of the fiber webs together such that the joint is formed. The form of the joint cut can vary and is selected depending on grade of the fiber web, and on thickness of the fiber web.

According to an advantageous feature the device is located in an unwinder of a slitter-winder.

According to an advantageous feature the device is located in an unwinder for pulp webs.

According to an advantageous feature the device is utilizable, when building a new slitter-winder, but also easily providable to already existing slitter-winders, for example in connection with modernization of a slitter-winder.

The part of the fiber web comprising the joint is advantageously guided to the bottom of the customer rolls or to the top of the customer roll or cut off after the fiber web has been led to the winder of the slitter-winder.

The invention is suitable for different kinds of fiber web grades, and it is very advantageous in connection with unwinding of thick fiber webs having a thickness about at least 0.14 mm and it is very advantageous in unwinding of pulp fiber webs. Density of the pulp fiber web is about 400-800 kg/m3 and thickness of the pulp fiber web is about 0.5-2.5 mm.

The invention is very advantageous when utilized in connection with an unwinder of a slitter-winder due to the sequential operation of the slitter-winders. The invention is also usable in connection with unwinders of other parts and sections of a fiber web production line.

By the method and the device according to the invention many advantages are achieved: cost savings are achieved as the construction of the equipment needed is less complicated than in the arrangements known from prior art. Advantageously no adhesive agent is used, and thus further cost savings are achieved and thus also the construction can be made simpler. The present invention also provides the possibility of joining web ends of different grades. In known joining methods using adhesives or tapes different fiber web grades sometimes require different adhesive or different tape to be used for a certain grade. Also, a simple and robust joining device construction is achieved as in cross-direction of the fiber web moving device is compact in size and can be produced of cost effective parts.

The exemplifying embodiments of the invention presented in this patent application are not to be interpreted to pose limitations to the applicability of the appended claims.

The verb "to comprise" and its derivatives are used in this patent application as an open limitation that does not exclude the existence of also unrecited features. The features described hereinafter are mutually freely combinable unless explicitly stated otherwise.

BRIEF DESCRIPTION OF THE DRAWINGS

In the following the invention is described in more detail referring to the accompanying drawing in which in FIGS. 1-7 is schematically shown an advantageous example of a device for joining ends of fiber webs in a parent roll change of an unwinder of a slitter-winder and stages of an advantageous example of a method for joining ends of fiber webs in a parent roll change of an unwinder of a slitter-winder, in FIG. 8 is schematically shown an advantageous example of a device for joining ends of fiber webs in a parent roll change of an unwinder of a slitter-winder and a stage of an advantageous example of a method for joining ends of fiber webs in a parent roll change of an unwinder of a slitter-winder and in FIG. 9 is shown another advantageous example of a gripping device the device for joining ends of fiber webs in a parent roll change of an unwinder of a slitter-winder.

DETAILED DESCRIPTION

Figure 1:
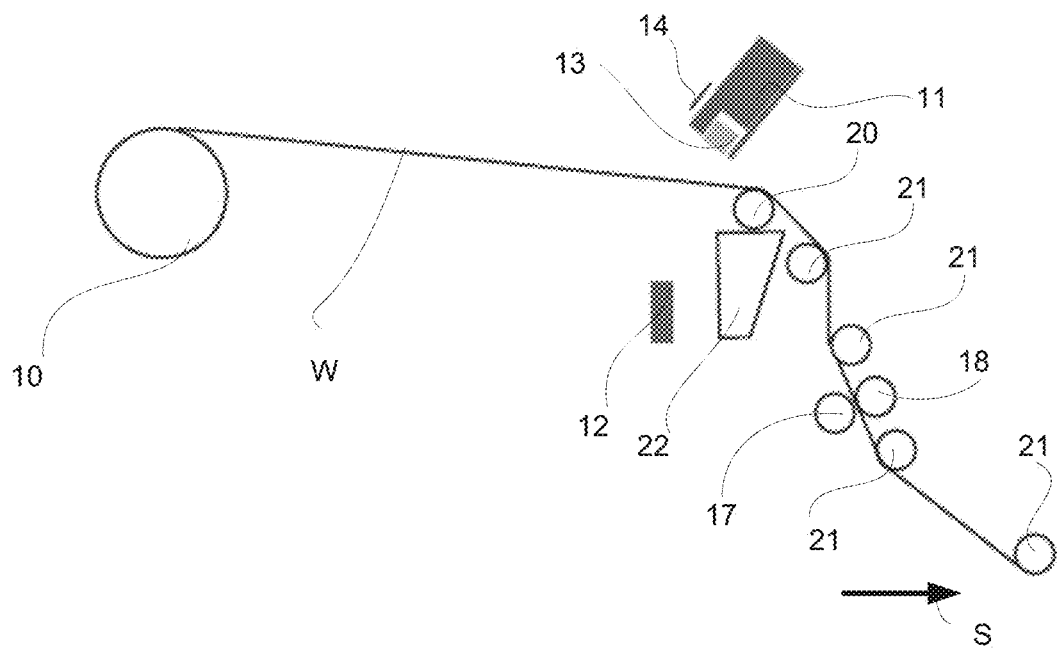

During the course of the following description like numbers and signs will be used to identify like elements according to the different views which illustrate the invention and its advantageous examples. In the figures some repetitive reference signs have been omitted for clarity reasons.

In FIGS. 1-8 is shown an example of a device for joining ends of fiber webs W, WN in a parent roll change of an unwinder 10 of a slitter-winder and stages of an example of a method for joining ends of fiber webs W, WN in a parent roll change of an unwinder 10 of a slitter-winder. In the example is shown also slitter blades 17, 18 of the slitter-winder. In the slitter-winder the parent roll is unwound in the unwinder 10, the full-width fiber web W, WN is slit on the slitting section by the slitter blades 17, 18 into several narrower partial fiber webs which are wound up on the winding section around winding cores or around winding shafts or around winding cores located on the shafts, such as spools, into customer rolls. When the customer rolls are completed, the slitter-winder is stopped and the rolls i.e. the so-called set is removed from the machine after which the process is continued with the winding of a new set. These stages are repeated periodically until the fiber web W runs out of the parent roll in the unwinder 10, whereby a parent roll to a new parent roll is performed in the unwinder 10, in which a trailing end of the fiber web W from the running out parent roll is attached to the beginning end of the fiber web WN from the new parent roll in the unwinder 10 and there after the operation continues again as the unwinding of the new parent roll in the unwinder 10, slitting the full-width fiber web into partial fiber webs by the slitter blades 17, 18 and winding the customer rolls. The slitter-winder may also comprise two unwinders 10, in which case when the fiber web W runs out of the parent roll in one of the unwinders, the unwinding is changed to unwinding of a parent roll in the other of the unwinders and the trailing end the fiber web W from the running out parent roll is attached to the beginning end of the fiber web WN from the new parent roll in the other unwinder 10 and there after the operation continues again as the unwinding of the new parent roll in the unwinder 10 and a parent roll change is performed in the one of the unwinders. The device for attaching the ends of the fiber webs W, WN comprises a tool element 11 with a gripping device, which in the examples of FIGS. 1-8 is an underpressure device providing underpressure as gripping effect, and a traversing punching device 13, advantageously joining wheel 13 as well as a counter element 12 for the tool element 11. The gripping device may also be constructed of a fork plate 15 and a gripping plate 16 (FIG. 9). Advantageously the counter element 12 is movable from a resting position (FIGS. 1 and 7) to a joining position (FIGS. 2-6) and the tool element 11 has a fixed position. Advantageously, downstream from the tool element 11 is located a support roll 20 supported on a support beam 22 for guiding the run of the fiber web W; WN and for supporting the trailing end of the fiber web W from the emptying parent roll during joining. The fiber web W; WN is guided to the slitting section and from there on by guide rolls 21.

The device comprises the tool element 11 comprising traversing punching device 13, advantageously a joining wheel 13 with at least one punching element, advantageously at least one punching blade, advantageously several punching elements, advantageously several punching blades, and punches the overlapping ends of the fiber webs W, WN and simultaneously joins the ends of the fiber webs W, WN. The wheel 13 with punching elements is configured to move across the fiber webs in cross-direction in a traversing way. The joining wheel 13 is advantageously an idle wheel and its rotating movement is provided by the fiber webs. The device also comprises a counter element 12 for the tool element 11. The counter element 12 is advantageously planar in its main outer form and may be provided with grooves for the punching elements of the wheel 13. The device is located between the parent roll in the unwinder 10 and the first roll 20, typically a row of successive segmented rolls, of the slitting section of the slitter-winder, above the open run of the fiber web W. The beginning end of the fiber web running from the new parent roll is moved to the joining position by the counter element 12. The distance of the counter element 12 in its resting position is close to the slitting section such, that it does not create an obstacle for an operator during threading. In the method and by the device the trailing end of the fiber web W from the emptying parent roll and the beginning end of the fiber web WN from the new parent roll in the unwinder 10 are guided to an overlapping position and pressed together by the tool element 11 and the counter element 12 simultaneously punching joining cuts by the punching elements of the traversing punching device 13 to both ends of the fiber webs W, WN such that a joint in tension direction of the fiber webs W, WN is achieved. The overlapping trailing end and beginning end of the fiber webs W, WN are punched by the at least one punching element of the traversing punching device 13 and provided with a joint cut form and tension of the fiber webs W, WN finalizes the locking between the ends of the fiber webs W, WN together such that the joint is formed. The form of the joint cut can vary and is selected depending on grade of the fiber web and on thickness of the fiber web.

In FIG. 1 is shown the stage in which the parent roll in the unwinder 10 of the slitter-winder is almost empty.

Figure 2:
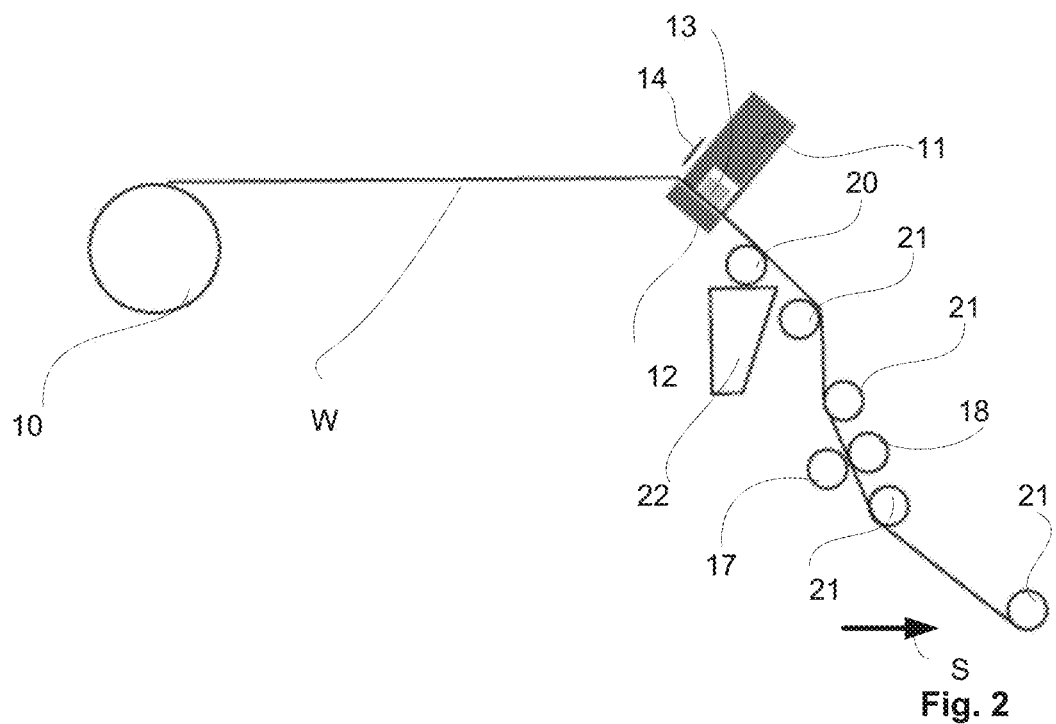

In FIG. 2 is shown the stage in which the counter element 12 moves the run of the fiber web W to the joining position and operation of the slitter-winder is interrupted.

Figure 3:
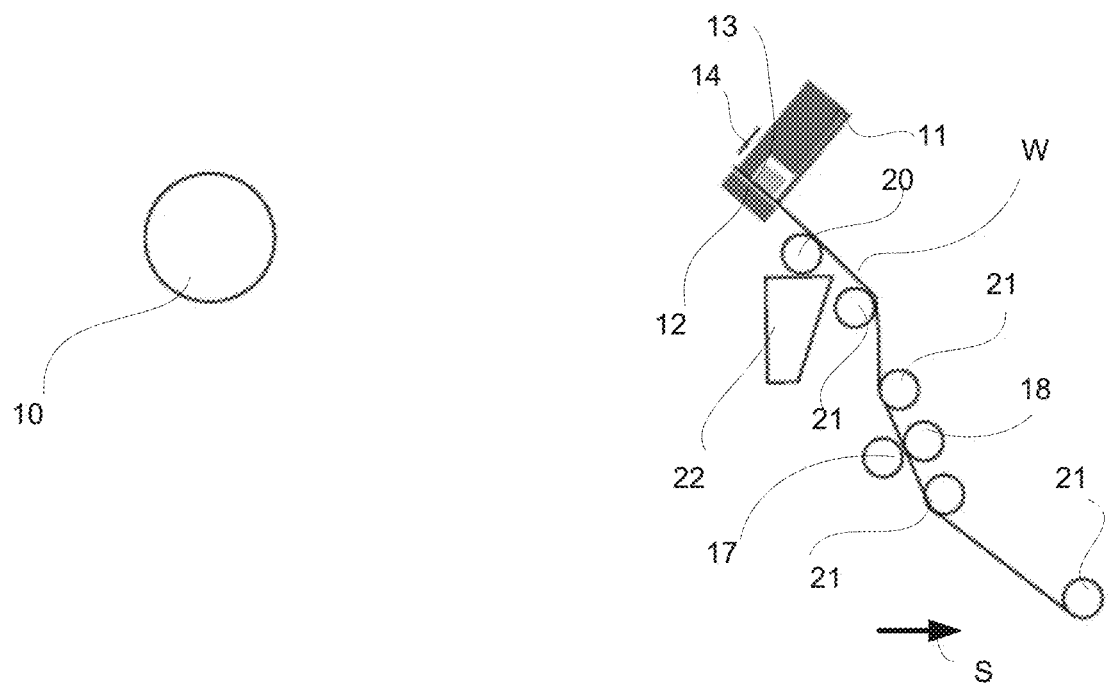

In FIG. 3 is shown the stage in which the cutting blade 14 cuts the fiber web W and the fiber web W remains attached to the tool element 11 by means of underpressure created by the underpressure device of the tool element 11.

Figure 4:
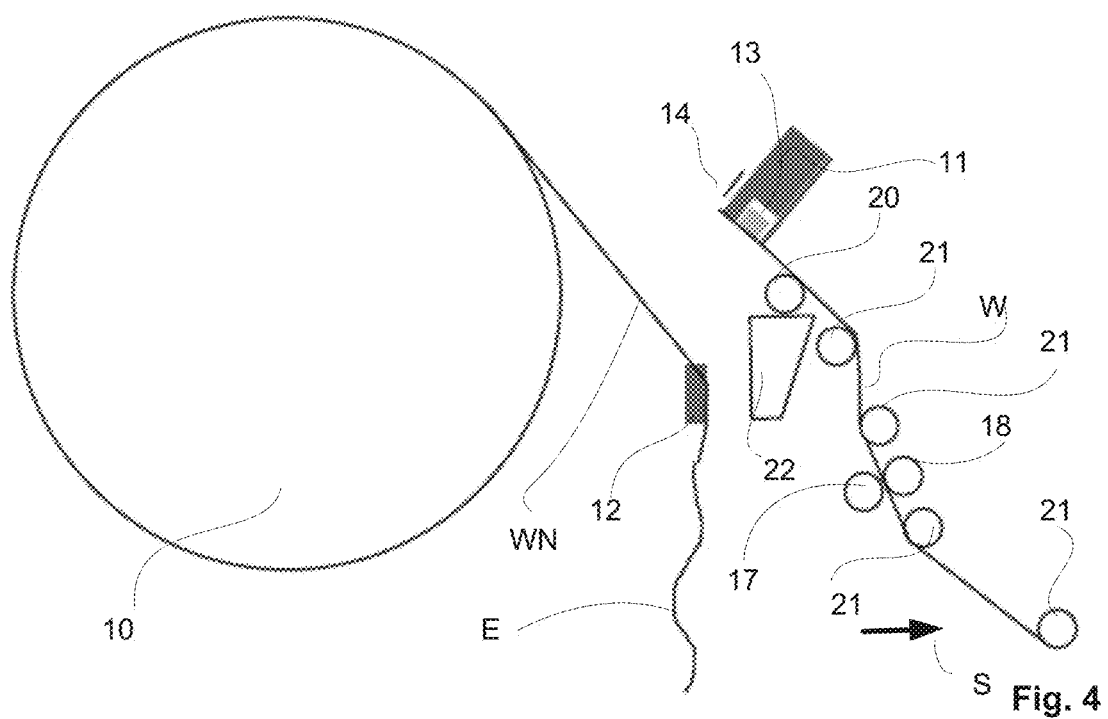

In FIG. 4 is shown the stage in which the new parent roll has been transferred to the unwinder 10. The new parent roll in the unwinder 10 is rotated, advantageously manually by an operator, and the end of the new fiber web WN is guided over the counter element 12, advantageously manually by an/the operator, and the rotating movement of the new parent roll in the unwinder 10 is stopped, advantageously manually by an/the operator.

Figure 5:
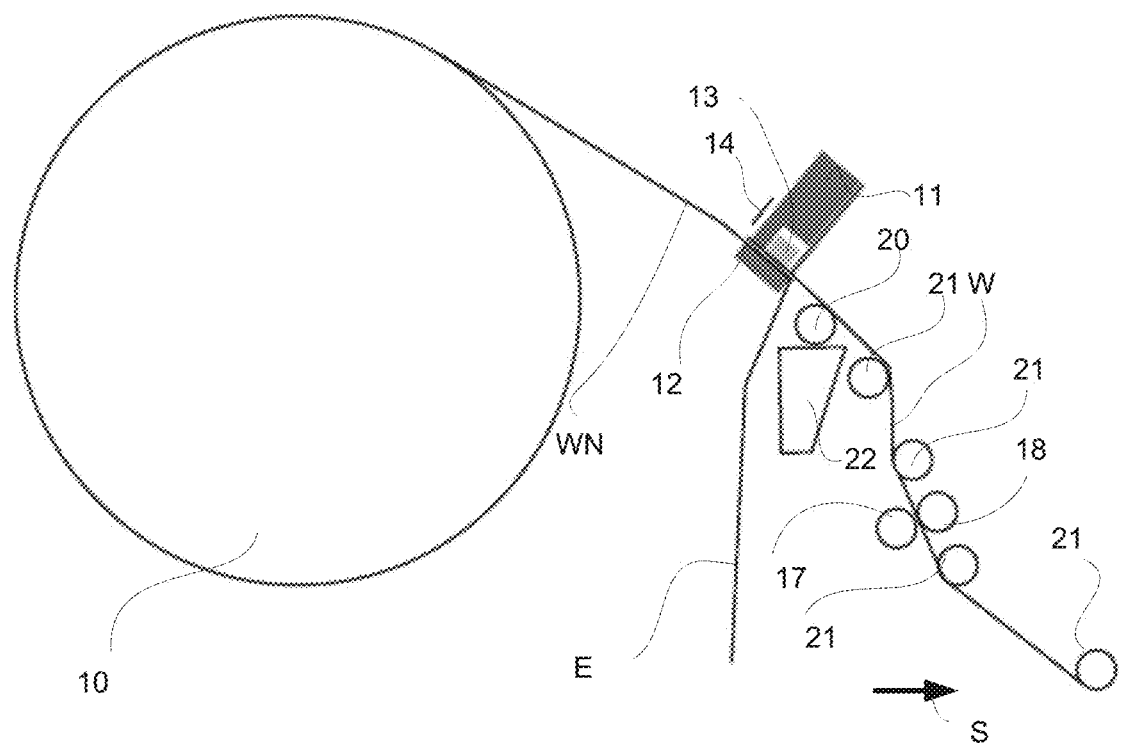

In FIG. 5 is shown a stage in which the counter element 12 moves the new fiber web WN to the joining position and presses the new fiber web WN against the fiber web W and the tool element 11. The traversing joining wheel 13 is moved across the width direction of the fiber webs W, WN i.e. in cross-direction of the fiber webs W, WN and makes the joint cuts to the ends of the fiber webs W, WN and joins the fiber webs W, WN to each other.

Figure 6:
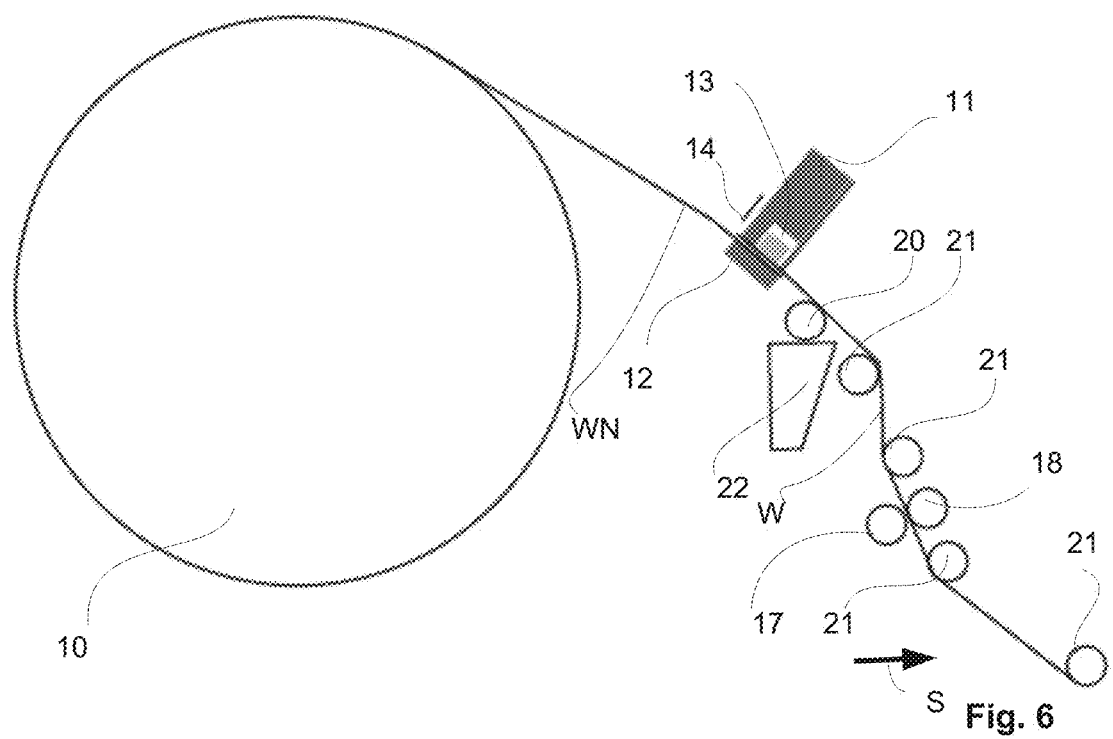

In FIG. 6 is shown a stage in which the beginning end of the new fiber web WN is cut, advantageously by an/the operator tearing the new fiber web WN against the sharp edge of the counter element 12, downstream from the joint for removing the beginning end. The beginning end of the new fiber web WN can also be cut during the joining of the ends of the fiber webs W, WN for example by a cutting element constructed as a part of the traversing joining wheel 13. The beginning end of the new fiber web WN can also be configured to be cut and removed by an automatic device.

Figure 7:
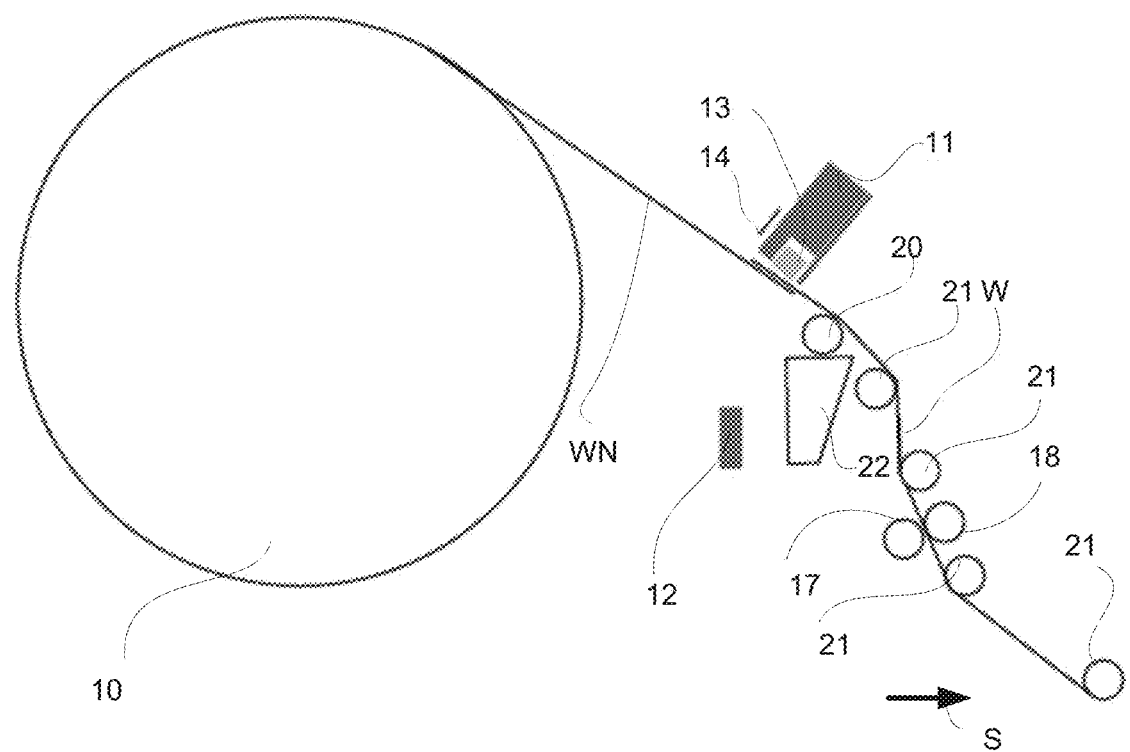

In FIG. 7 is shown a stage in which control of tension of the joined fiber webs W, WN is turned on and the counter element 12 is moved to its resting position. The joint joining the ends of the fiber webs W, WN is ready and the operation of the slitter-winder continues.

Figure 8:
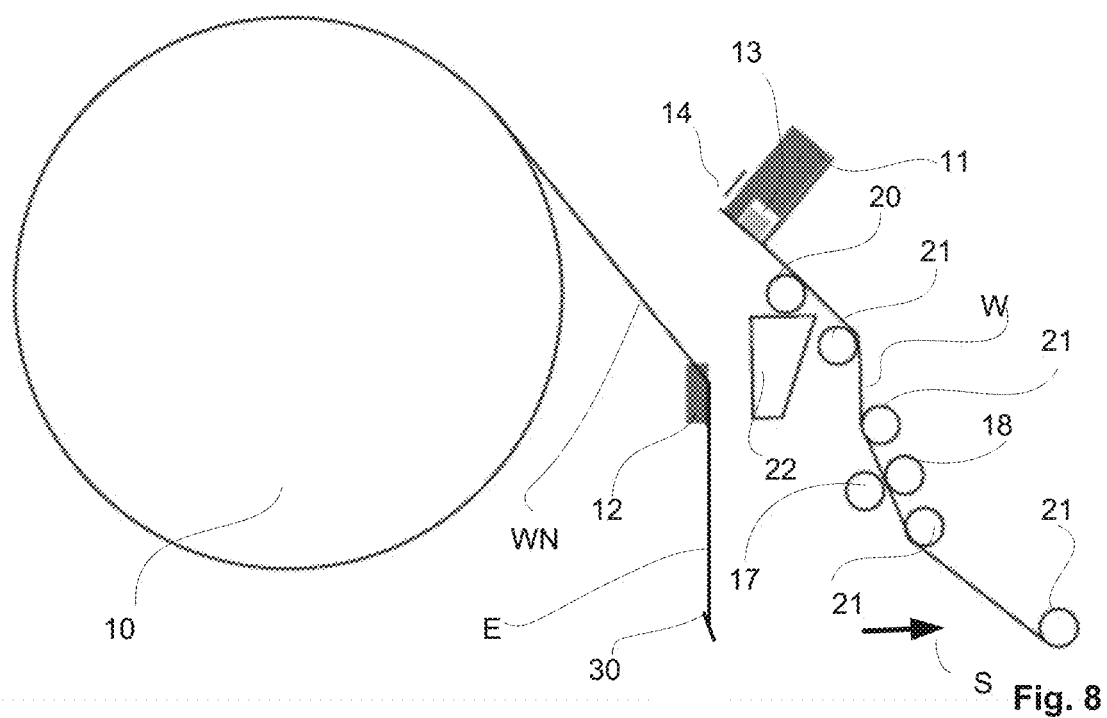
Figure 9:
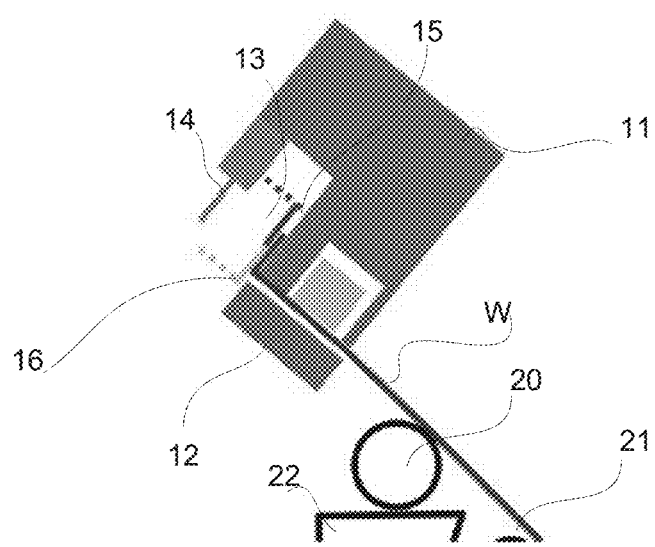

In FIG. 8 is shown the stage in which the new parent roll has been transferred to the unwinder 10. The new parent roll in the unwinder 10 is rotated, advantageously manually by an operator, and the end of the new fiber web WN is guided to a pulper, in which the end of the fiber web WN is tensioned and straightened by an element 30 of the pulper for the joining of the ends of the fiber webs and the rotating movement of the new parent roll in the unwinder 10 is stopped, advantageously manually by an/the operator.

In FIG. 9 is shown an example, in which the tool element 11 comprises as the gripping device a gripping plate 16. In the stage of the FIG. 9 the cutting blade 14 cuts end of the fiber web W and a gripping plate 16, which is turnably attached to the counter element 12, moves the free end of the fiber web W against the side of the tool element 11. The tool element comprises a fork plate 15, which is turnably attached to the tool element 11, which is turned to press the end of the fiber web W. After this the gripping plate 16 is opened and the counter element 12 can be lowered.

In the description in the foregoing, although some functions have been described with reference to certain features, those functions may be performable by other features whether described or not. Although features have been described with reference to certain embodiments or examples, those features may also be present in other embodiments or examples whether described or not. Above the invention has been described by referring to some advantageous examples only to which the invention is not to be narrowly limited. Many modifications and alterations are possible within the invention as defined in the following claims.

REFERENCE SIGNS USED IN THE DRAWING 10 unwinder
11 tool element
12 counter element of the tool element
13 joining wheel
14 cutting blade
15 fork plate
16 gripping plate
17, 18 slitter blades of the slitting section
20 support roll
21 guide roll
22 support beam
30 element of pulper
W fiber web
WN new fiber web
S travelling direction of the fiber web

The invention claimed is:

1. Device for joining ends of fiber webs in a parent roll change of an unwinder comprising a tool element, a gripping device for attaching a trailing end of a fiber web from an emptying parent roll in the unwinder to an beginning end of a fiber web from a new parent roll, the tool element comprising a traversing punching device configured to move across overlapping ends of the trailing end of the fiber web from the emptying parent roll and of a beginning end of a fiber web from a new parent roll in a width direction of the fiber webs to make at least one joint cut to the overlapping ends of the fiber webs and to join the ends of the overlapping fiber webs.

2. Device according to claim 1, wherein the tool element comprises the gripping device configured as an underpressure device for attaching the trailing end of the fiber web.

3. Device according to claim 1, wherein the device for joining ends of fiber webs in a parent roll change of an unwinder further comprises a counter element of the tool element configured to press the overlapping ends of the trailing end of the fiber web from the emptying parent roll and the beginning of the fiber web from the new parent roll together during the joining movement of the traversing punching device.

4. Device according to claim 3, wherein the counter element of the tool element is configured to move the trailing end of the fiber web from the emptying parent roll to the joining position at the tool element.

5. Device according to claim 1, wherein the traversing punching device is a joining wheel with at least one punching element.

6. Device according to claim 5, wherein the joining wheel is an idle wheel and its rotating movement is provided by the fiber webs, which are locked to place by the counter element.

7. Device according to claim 1, wherein the device for joining ends of fiber webs in a parent roll change of an unwinder is located in a slitter-winder and upstream from a first roll of the slitter winder.

* * * * *